US007680715B2

(12) United States Patent
Waelbroeck et al.

(10) Patent No.: US 7,680,715 B2
(45) Date of Patent: Mar. 16, 2010

(54) SYSTEMS AND METHODS FOR PROVIDING ANONYMOUS REQUESTS FOR QUOTES FOR FINANCIAL INSTRUMENTS

(75) Inventors: Henri Waelbroeck, Scarsdale, NY (US); Brent Gamse, Delray Beach, FL (US); Fred J. Federspiel, Larchmont, NY (US)

(73) Assignee: Pipeline Financial Group, Inc., New York, NY (US)

( * ) Notice: Subject to any disclaimer, the term of this patent is extended or adjusted under 35 U.S.C. 154(b) by 636 days.

(21) Appl. No.: 11/409,534

(22) Filed: Apr. 21, 2006

(65) Prior Publication Data

US 2007/0005484 A1 Jan. 4, 2007

Related U.S. Application Data

(63) Continuation-in-part of application No. 10/799,205, filed on Mar. 11, 2004, which is a continuation-in-part of application No. 10/603,100, filed on Jun. 24, 2003, which is a continuation-in-part of application No. 09/870,845, filed on May 31, 2001, which is a continuation-in-part of application No. 09/750,768, filed on Dec. 29, 2000, which is a continuation-in-part of application No. 09/585,049, filed on Jun. 1, 2000, now Pat. No. 7,356,500.

(51) Int. Cl.
  *G06Q 40/00* (2006.01)
(52) U.S. Cl. ............................... 705/35; 705/37; 705/38

(58) Field of Classification Search .................. 705/35, 705/36, 36 R, 37, 38, 39
See application file for complete search history.

(56) References Cited

U.S. PATENT DOCUMENTS 5,101,353 A * 3/1992 Lupien et al. .................. 705/37

(Continued)

OTHER PUBLICATIONS

Credit Swap Shop, Collections & Credit Risk, V 2, n6, p. 62, Jun. 1997.*

(Continued)

*Primary Examiner*—Alexander Kalinowski
*Assistant Examiner*—Bruce I Ebersman
(74) *Attorney, Agent, or Firm*—Steven D. Underwood; Cowan, Liebowitz & Latman

(57) ABSTRACT

Embodiments of the invention provide an anonymous RFQ system for financial instruments that resolves the inherent conflict between a capital provider's need for information and a market participant's need for confidentiality by creating an environment where market participants and capital providers can realize the benefits of sharing confidential trading interest (CTI) information without sacrificing anonymity or enabling information leakage. This secure environment preferably is created within an electronic matching book that distills all CTI information related to each Request for Quote (RFQ) into a risk class that is sent to capital providers in lieu of order-identifying or trader-identifying information. These risk classes give capital providers enough information to offer customized, risk-adjusted quotes without requiring the market participant to reveal confidential information about herself or her order.

17 Claims, 3 Drawing Sheets

U.S. PATENT DOCUMENTS

| | | | |
|---|---|---|---|
| 5,136,501 A * | 8/1992 | Silverman et al. | 705/37 |
| 5,689,652 A | 11/1997 | Lupien et al. | |
| 5,717,989 A * | 2/1998 | Tozzoli et al. | 705/37 |
| 5,802,499 A * | 9/1998 | Sampson et al. | 705/35 |
| 5,845,266 A | 12/1998 | Lupien et al. | |
| 5,905,975 A * | 5/1999 | Ausubel | 705/37 |
| 6,092,197 A * | 7/2000 | Coueignoux | 726/21 |
| 6,151,588 A * | 11/2000 | Tozzoli et al. | 705/37 |
| 6,260,024 B1 * | 7/2001 | Shkedy | 705/37 |
| 6,282,521 B1 * | 8/2001 | Howorka | 705/36 R |
| 6,317,727 B1 * | 11/2001 | May | 705/36 R |
| 6,343,278 B1 * | 1/2002 | Jain et al. | 705/36 R |
| 6,529,885 B1 * | 3/2003 | Johnson | 705/64 |
| 6,622,131 B1 * | 9/2003 | Brown et al. | 705/38 |
| 6,985,883 B1 * | 1/2006 | Togher et al. | 705/37 |
| 7,136,834 B1 * | 11/2006 | Merrin et al. | 705/37 |
| 7,162,447 B1 * | 1/2007 | Cushing | 705/37 |
| 7,165,045 B1 * | 1/2007 | Kim-E | 705/37 |
| 7,356,498 B2 * | 4/2008 | Kaminsky et al. | 705/37 |
| 2001/0027437 A1 * | 10/2001 | Turbeville et al. | 705/38 |
| 2002/0128945 A1 * | 9/2002 | Moss et al. | 705/37 |
| 2002/0138390 A1 * | 9/2002 | May | 705/37 |
| 2002/0161687 A1 * | 10/2002 | Serkin et al. | 705/37 |
| 2003/0018558 A1 * | 1/2003 | Heffner et al. | 705/37 |
| 2003/0093343 A1 * | 5/2003 | Huttenlocher et al. | 705/35 |

OTHER PUBLICATIONS

EP Appln. No. 05729202 Supplementary European Search Report, Feb. 5, 2008.
Domowitz I: "A Taxonomy of Automated Trade Execution Systems", Journal of International Money and Finance of Butterworth Scientific, Guildford, GB, vol. 12, 1993, pp. 607-632.
Hendershott T: "Electronic Trading In Financial Markets", IT Pro, Jul./Aug. 2003, pgs. 10-14.
Madden, Bartley J.; *Structural Changes in Trading Stocks*; The Journal Of Portfolio Management; 1993, No. 10093; pp. 19-27.

* cited by examiner

| Symbol ▼ | Exchange where traded | | | |
|---|---|---|---|---|
| Open | Last | High | | Time |
| Prior Day Close | Net Change | Low | | Current volume traded |

| Bid Volume | Location/Capital Provider | Price | Offer Volume | Location/Capital Provider | Price |
|---|---|---|---|---|---|
|  |  |  |  |  |  |
|  |  |  |  |  |  |
|  |  |  |  |  |  |
|  |  |  |  |  |  |
|  |  |  |  |  |  |

| Quantity | Price | Order Type ▼ | Route ▼ | Expiration |
|---|---|---|---|---|

| Display Qty | Auto Refresh ⌐ Yes ⌐ No | AR Frequency | Display ID ⌐ Yes ⌐ No |
|---|---|---|---|

| BUY | SELL | UPDATE | NEGOTIATE | CANCEL |
|---|---|---|---|---|

FIG. 2

| Symbol | Exchange where traded | Acceptable Risk Classes | |
|---|---|---|---|
| Open | Last | High | Time |
| Prior Day Close | Net Change | Low | Current volume traded |

| PENDING RFQs | | | | | |
|---|---|---|---|---|---|
| Symbol | Risk Class | Volume | Side | Time Active | Market Participant ID |
| | | | | | |
| | | | | | |
| | | | | | |
| | | | | | |

Risk Class ⌐ A ⌐ B ⌐ C ⌐ D  Display ID  ⌐ Yes  ⌐ No  Expiration

Bid Quantity   Bid Price   Offer Quantity   Offer Price

POST   UPDATE   NEGOTIATE   CANCEL

FIG. 3

SYSTEMS AND METHODS FOR PROVIDING ANONYMOUS REQUESTS FOR QUOTES FOR FINANCIAL INSTRUMENTS

CROSS REFERENCE TO RELATED APPLICATIONS

This application is a continuation in part of U.S. patent application Ser. No. 10/799,205, filed Mar. 11, 2004, which is a continuation-in-part of U.S. patent application Ser. No. 10/603,100, filed Jun. 24, 2003, which is a continuation in part of U.S. patent application Ser. No. 09/870,845, filed May 31, 2001, which is a continuation-in-part of U.S. patent application Ser. No. 09/750,768, filed Dec. 29, 2000, which is a continuation-in-part of U.S. patent application Ser. No. 09/585,049, filed Jun. 1, 2000 now U.S. Pat. No. 7,356,500. The entire contents of each of the above-listed applications are incorporated herein by reference.

BACKGROUND

When a market participant in the public securities market (or any financial market) needs to execute a large (block) order, that participant faces a significant challenge: achieving an economically efficient transaction in a timely manner. As used herein, the term "market participant" refers to any person or firm with the ability to trade securities; examples of market participants include broker-dealers, institutions, hedge funds, statistical arbitrage and other proprietary trading operations, and private investors trading on electronic communication networks (ECNs). There are a number of reasons why the timely and efficient execution of large orders is a particular challenge. First and foremost, the move to decimalization, coupled with a drastic increase in the number of trading venues, has driven down the average trade size from 1,187 shares in December of 2000 to 393 shares in December of 2004 (NYSE Fact Book online). As a result, the display of a large block is an anomaly, and tends to create adverse price action. This adverse action is driven by many factors, including "front running" (buying or selling activity by other market participants in anticipation of price movement resulting from the large revealed order), and the general increase in trading activity, based solely on the assumption that a large buy (or sell) interest indicates that a stock is worth more (or less) than its current price.

In order to avoid, or at least reduce, the negative market impact caused by the display of large orders, most participants choose to divide larger orders into a series of smaller orders, which they then enter through multiple trading venues over an extended period of time. This tactic can reduce adverse market impact and protect the confidentiality of a larger order. However, with this approach a market participant has no guarantee of enough fills to complete the larger order, or any idea of the range of prices she will need to accept in order to complete the transaction. As a result, confidentiality is maintained, but in exchange the market participant sacrifices the efficiency of a quick fill at a single, known price.

Market participants often turn to capital providers (also called dealers and market makers) when they do not want to accept the confidentiality vs. efficiency trade-off offered by exchanges, alternate trading systems, and ECNs. However, a market participant who chooses to work with a capital provider still faces a similar set of trade-offs: information leakage vs. quality of spread. Because a capital provider commits its own capital, when a market participant makes a Request for Quote (RFQ), a capital provider must respond with a quote that reflects the risk inherent in the position it will own if the transaction executes. The degree of risk is driven by a number of factors, including the type of stock, the price of the stock, the stock's liquidity, general market conditions, and the behavior of the market participant post-execution. Because the capital provider must consider so many risk factors in pricing its response, the more information a capital provider has about a request, the more accurate its risk-assessment and the tighter the responding spread.

Therefore, to enable a capital provider to offer the most competitive spread possible, a market participant must reveal a great deal of very valuable information: who she is, what stock she wants to trade, the size of her order, the side of her order, and the price that will satisfy her. While this information enables capital providers to offer the tightest spreads, it also represents a real option that the capital provider can use to his own advantage. It is difficult to distinguish, on the one hand, information that is legitimately required to estimate risk, and on the other hand, information that could be exploited by the capital provider's proprietary trading desk outside the scope of the customer's interests. For example, an institutional order seeking capital might be the first slice of a multi-million share order, and the overall strategy and price aggression for completing the full order must remain confidential to ensure that this strategy and the entire block can be properly executed.

Thus, a fundamental problem for capital providers and their customers lies in the fact that much of the information that is required to evaluate accurately the risk of providing capital is by its nature too confidential for a market participant to share with the capital provider. If a market participant chooses to limit the information she gives to the capital provider in the interest of protecting the option value of her trade information, she does reduce the likelihood that her order information will be used against her. But at the same time, providing less information reduces the accuracy of the capital provider's risk assessment, thereby increasing the size of the spread.

Up to this point, market participant/capital provider transactions have been plagued by the inefficiencies inherent in a system that forces both parties to make significant tradeoffs: market participants must choose between tighter spreads and potential information leakage, and capital providers must choose between customer satisfaction and potential risk. At present, the inventors are aware of three pending applications that attempt to address these inefficiencies, though they do so in ways that are markedly different from the subject system. It should be noted that the discussion herein of these applications does not imply that they are prior art, since this application claims priority to applications filed as early as June 2000.

United States Patent Application Publication No. 20050246261, "Method and System for Block Trading of Securities," to Stevens et al. and assigned to Bank of America, teaches an "automated dealer system that formulates customized, risk-controlled, two-sided indicative quotations for block quantities of a security." This system attempts to address the information/spread quality conflict by offering a spectrum of quote customizations. At the end of the spectrum focused on confidentiality, a generic quote is adjusted according to "the size of the block, and at least one historical characteristic of the security. Historical characteristics for securities can include a historical spread, volatility, liquidity, or other characteristics." At the other end of the spectrum, focused on quality of the spread, the quote is further customized through the application of a "client-specific profitability constant," that associates the market-participant's identity and trading history to his RFQ. While this system improves on the traditional dealer market by enabling market participants to match their quote customization level to the point on the confidentiality/spread quality spectrum that best suits their needs, the system still forces a tradeoff between quote quality and confidentiality.

United States Patent Application Publication No. 20030033239, "Request for Quote (RFQ) and Inside Markets," to Gilbert et al., also attempts to address the challenges associated with anonymous capital providing. This application teaches "systems and methods for rule-based bilateral negotiation of quotes in response to request for quotes (RFQ) and inside markets." The system enables market participants and capital providers (CPs) to share a range of user-selected data points in a controlled dialogue or rules-based negotiation. Since all information in the negotiation is shared directly with the CPs, it does not provide a means to obtain a better spread while protecting the confidentiality of the information used to estimate risk. It also does not enable reducing the option value of the information.

The primary focus of the Gilbert system is to ensure that information shared between market participants and capital provider(s) is protected, rather than trying to minimize the amount of information that needs to be shared. Another significant aspect of this system is that it enables rules-based negotiation "that emulates a voice request for a final price." But, as with the Bank of America system, the quality of the quote generated through this system is ultimately tied to the amount of information shared between the two parties. Although the move towards "policing" behavior is a dramatic improvement on traditional dealer markets, the fact that there are "rules" does not change the reality that this system requires participants to share confidential information in order to achieve the best quote. For example, if a market participant uses this system, and chooses to remain anonymous but indicates that she trades for a hedge fund, she is likely to receive a bigger spread, even if her historic trading behavior does not warrant a larger spread. To achieve the best spread in Gilbert's system, the "well behaved" hedge fund trader would ultimately have to reveal her identity or past trading history to get a fair quote.

The system of United States Patent Application Publication No. 20020091617, "Trading program for interacting with market programs on a platform," to Christopher Keith, is a complex trading platform that attempts to address the inefficiencies found in all "conventional financial instrument trading systems." The essential goal of Keith's system is to enable market participants and capital providers to input their order and liquidity providing requirements via intelligent agents which "decide" how, when, and where to input and execute orders based on criteria pre-programmed by the users. The purpose of this system is to provide users with a flexible platform that offers the speed and convenience associated with electronic trading, without losing the advantages of floor trading and without forcing traders to abandon the use of "private, interpersonal agreements and arrangements that have been considered unsuitable for automation in conventional trading systems."

In order to achieve this goal, Keith's system permits market participants to employ "electronic liquidity finder" (ELF) programs, and market providers to employ "umpires" to act on their behalf inside a black box. ELFs are described as "virtual floor brokers working at electronic speeds," and umpires are "formal or informal markets that define and implement the rules of engagement by which information is exchanged between ELFs." ELFs and umpires interact through a wide range of complex and nuanced rules that allow traders to combine the benefits of an electronic trading platform with a level of customization and personalization associated with floor-based trading.

While Keith's system does offer traders more control over the information leakage related to their orders, it is not a Request For Quote system: CPs are able to submit trading algorithms, but they are not able to decide on a case by case basis (according to order information or a risk classification system) whether or not they should respond to an RFQ. Likewise, the market participants are not able to review a plurality of quotes and decide, looking at their own strategic interests, whether or not to execute a CP's quote.

SUMMARY

As noted above, the historic conflict between the need for information and the need for confidentiality in the traditional dealer market has been characterized by a trade-off between quote quality and level of trader/order anonymity. To return the tightest spreads, capital provider(s) have required a good deal of confidential and valuable information to ensure an accurate risk assessment. On the other hand, market participants have been forced to weigh the risks associated with giving capital providers a level of information about their orders and their positions that could be used outside of their interests.

In order to solve this problem the subject system provides an anonymous RFQ environment for financial instruments where market participants and capital providers can realize the benefits of sharing confidential trading interest (CTI) information without sacrificing anonymity or enabling information leakage. This secure environment is created within an electronic matching book that distills all CTI information related to each Request for Quote (RFQ) into a risk class that is sent to capital providers in lieu of order-identifying or market-participant-identifying information. These risk classes give capital providers enough information to offer customized, risk-adjusted quotes without requiring the market participant to reveal confidential information about himself or his order. As a result, both capital providers and market participants benefit from inputting information they would never share with each other in a non-anonymous environment.

In a preferred embodiment, the subject system initially receives an RFQ from a market participant. Immediately after receiving the RFQ, the subject system performs a risk analysis based on a risk function driven by confidential information about the RFQ and the trader's historic behavior on the system, in conjunction with an assessment of current market conditions. Information for the historic trader behavior query is pulled from an "events database," as described below in the detailed description. The product of this risk analysis is a risk classification that is associated with the RFQ. It is important to note that in the preferred embodiment, this risk categorization is the only link to the market participant's confidential information and is never associated with an identity outside of the system. As a result of this risk classification system, capital providers are assured that their quotes are based on an accurate assessment of risk, enabling them to reduce the volatility in their returns, while market participants get the benefit of tighter spreads without sacrificing their anonymity or other confidential information.

Once the system has produced a risk classification for an RFQ, it then sends a message to the capital providers on the system indicating that an RFQ has been entered into the system. Preferably, only the symbol of the RFQ and the risk category are included in this message. All interested capital providers then return a two-sided quote based on the risk classification sent by the subject system. The RFQ and responding spreads are compared within the system, and if there is a match, the subject system auto-executes the trade, maintaining both market participant and capital provider anonymity throughout execution, processing and clearing. In the case of multiple responses, the system processes quotes on a price-time priority.

After execution, the trade also is cleared in a manner that maintains permanent anonymity, with the system acting as a broker between market participant and the capital provider. The system is responsible for reporting executed orders to both parties' back-office systems, for reporting executed trades to the National Market consolidated tape, and for processing post trade clearing functions.

If there is no match between the RFQ and any of the corresponding spreads, the quotes are displayed to the market participant by means of a graphic interface. Once quotes are displayed, the market participant has the option to modify his price aggression at any time; if a revised RFQ is aggressive enough to cross the contra order, the subject system will auto-execute the trade. Both the RFQ and the quotes will remain live in the subject system until they expire after a time-in-force specified by the market participant and capital provider(s), respectively. In addition, both the market participant and the capital provider(s) may elect to cancel an RFQ or a quote at any time.

In a preferred embodiment of the subject system, no confidential information leaves the system. All confidential information is distilled into the risk classification, and only that risk classification is revealed to capital providers, eliminating the possibility of information leakage. As a result, market participants maintain anonymity, but are still rewarded (or penalized) with spreads that reflect their trading behavior on the system, while capital providers minimize their unknown risk exposure and maximize the number of RFQs to which they can confidently respond.

In one aspect, the invention comprises a method for providing an anonymous request for quotation environment that enables sharing of confidential trading interest information without sacrificing anonymity or enabling information leakage, comprising: receiving a request for quotation from a market participant; and associating a risk categorization with the request for quotation.

In various embodiments: (1) the request for quotation comprises an initial block quantity for which a quote is requested; and a time lag following which an additional request will be sent for an additional block quantity; (2) the method further comprises transmitting a message to one or more capital providers, the message comprising: (a) a symbol for the request for quotation and (b) the risk categorization; (3) associating a risk categorization comprises performing a risk analysis based at least in part on confidential information regarding the request for quotation and the market participant; (4) the confidential information includes information about price movements following past requests for quote from the same market participant; (5) the risk analysis is further based on an assessment of current market conditions; (6) the method further comprises receiving from at least one of the one or more capital providers a two-sided quotation based on the risk classification; (7) the method further comprises enabling the one or more capital providers to respond to a request for quotation with a "mismatched" quotation that cannot auto-execute, and further enabling the market participant to initiate a negotiation with the capital provider; (8) the method further comprises comparing the request for quotation to the quote, determining that a match exists, and executing a trade; (9) the method further comprises maintaining permanent anonymity when clearing the trade; (10) the method further comprises revealing the market participant's identity to a capital provider with whom the trade executes, either before or after the trade, only if the capital provider is on a list approved by the market participant and the market participant opts to reveal the market participant's identity; (11) the method further comprises displaying to the market participant one or more quotations from the one or more capital providers by means of a graphical user interface; (12) the method further comprises enabling the market participant to modify pricing of the request for quotation via the graphical user interface, enabling auto-execution in the event that a new price is aggressive enough to execute; (13) the graphical user interface enables the one or more capital providers or the market participant to cancel a request for quotation or a responding quotation at any point in time; (14) the request for quotation specifies at least one risk class for acceptable contra parties for trade execution; (15) the request for quotation specifies at least one risk class for parties viewing the request for quotation; (16) the method further comprises transmitting a message to one or more capital providers, the message comprising a symbol for the request for quotation; (17) the method further comprises receiving from at least one of the one or more capital providers a two-sided quotation for each risk classification with which the at least one capital provider is willing to trade; (18) the request for quotation is transmitted only to select capital providers and wherein the market participant's identity is provided only to the select capital providers; and (19) the method further comprises: (a) transmitting a message to one or more capital providers, the message comprising a symbol for the request for quotation but not the risk classification; (b) receiving one or more one-sided or two-sided conditional quotations from one or more capital providers; and (c) displaying one of the one or more conditional quotations to the market participant only if the risk classification associated with the request for quotation is less than a maximum risk level associated with the one of the one or more conditional quotations.

There are many alternate embodiments of this invention that will be clear to those skilled in the art, and it should be obvious to one of ordinary skill that the subject system may be practiced in embodiments other than those described in the detailed description, without departing from the spirit and scope of the present invention. One of these alternate embodiments integrates certain features from the subject system into a pre-existing alternate trading system (ATS); thereby replicating the functionality of the subject system within a "host" ATS. As a result, this alternate embodiment would enable any existing ATS to offer a confidential, highly competitive, auto-executable RFQ system as an adjunct to their suite of trading tools.

BRIEF DESCRIPTION OF THE DRAWINGS

FIG. 2 depicts a preferred graphical user interface for order entry.

FIG. 3 depicts a preferred graphical user interface for displaying RFQ message information.

DETAILED DESCRIPTION OF PREFERRED EMBODIMENTS

Figure 1:
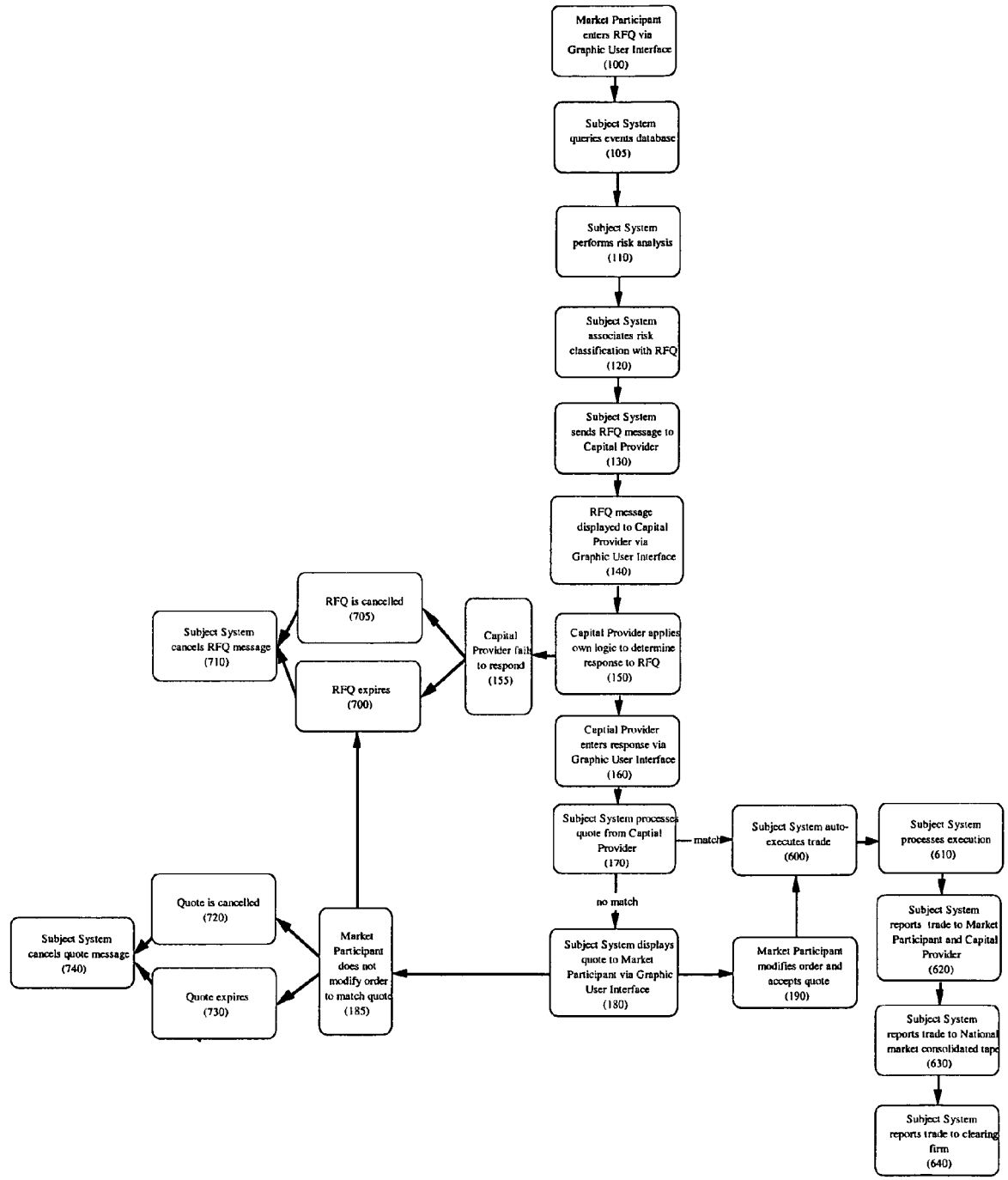
FIG. 1 is a flow diagram showing steps of preferred method embodiment.

The following is a functional description of preferred and alternate embodiments of the subject invention. A preferred system embodiment of the present invention comprises a trading system able to receive and execute customer orders, to report completed trades to a clearing firm as well as a market participant's (MP's) and capital providers'(CPs') back-office operations, and to provide the necessary user interfaces and help desk interfaces as known in the art. The system preferably facilitates capital providing trades through the following steps (see FIG. 1):

In step 100 the market participant places an RFQ into the subject system. The RFQ is preferably entered through a Graphic User Interface (GUI) or an electronic interface compliant with the Financial Information Exchange (FIX) protocol. An example of a graphic user interface for order entry that supports optional fields to be described in this application is depicted in FIG. 2. This order entry can include, but is not limited to, the following order attributes: side, quantity, and auto-executable price.

After an RFQ has been entered, the subject system queries the "events database" in step 105 and then performs a risk analysis in step 110. The risk analysis is based on a risk function driven by confidential information about the RFQ and the trader's historic behavior on the system, in conjunction with an assessment of current market conditions. A preferred risk function is described in detail below. The "events database" is a database that provides information related to a trader's historic behavior on the subject system. System events pertaining to orders placed, canceled, expired, or filled are associated with a particular trader, stored in the events database, and used to optimize the risk classification function, as will be described below. Following each event, a preferred embodiment of the subject system launches a process to calculate the volume-weighted average price (VWAP) of the symbol as it trades on the continuous markets up to aggregate sizes of 2, 5, and 10 times the quantity of the event (displayed quantity for an expired or cancelled order, or filled quantity for a completed transaction). This VWAP information is stored in the database together with the corresponding event and the name of the associated trader.

The product of the risk analysis is a risk classification which is associated with the corresponding RFQ in step 120. Once the RFQ has been assigned a risk class, the subject system (for brevity, the term "subject system" is used herein, instead of "preferred embodiment of the subject system"; those skilled in the art will understand that the entire discussion relates to particular embodiments only, and is not intended to limit the scope of the invention or the claims) sends an RFQ message to all CP participants through its API in step 130. This RFQ message preferably contains only the RFQ symbol and the risk classification.

In step 140, the RFQ message information is displayed to the CP by means of a GUI application. An example of a GUI application that supports RFQ message information display to CPs is given in FIG. 3. In step 150, the capital provider(s) apply their own logic to determine whether or not to respond to the RFQ. In the absence of any response by a CP (step 155) the RFQ will expire after a predetermined time-in-force in step 700 or be canceled without a fill in step 705. In both cases the subject system cancels the RFQ messages in step 710, concluding the process.

If the capital provider(s) elect to respond, they will do so by placing an order in step 160 in said GUI from step 140. In step 170 the subject system processes the responding order received from the CP; if the responding order matches the side, price and quantity attributes of the RFQ, the subject system auto-executes the trade in step 600. The subject system processes the execution in step 610 and reports it to both parties using FIX in step 620, and to the National Market consolidated tape and clearing firms using protocols known to those skilled in the art in steps 630 and 640 respectively.

If there is no auto-execution, in step 180 the subject system displays the quote to the market participant by means of said GUI application from step 100. The market participant may then elect to accept the quote, by modifying her order in the subject system to match the quote's price attributes in step 190 at which point the subject system will auto-execute and process the trade in steps 600-640.

An RFQ or quote may expire or be canceled by the corresponding market participant or capital provider at any time in this process. The cancellation or expiration of a market participant order in step 700 or 705 respectively will result in the cancellation of the RFQ messages in step 710. The cancellation or expiration of a quote in step 720 or 730 respectively will also result in the removal of the displayed quote in step 740.

As previously mentioned, the subject system relies on a preferred risk function to generate the risk classification that is sent to capital providers. This preferred risk categorization is based on a series of inputs both from within and outside of the subject system, including but not limited to confidential information from RFQ order entry, the events database and general market analytics. This information can be captured through a set of questions; the corresponding set of answers forms the input vector to calculate the risk in the market participant's order.

The following list represents some of the questions that may be used to calculate the adverse information risk in a market participant's order:

Has this MP placed an order in this symbol before?
    On the same day?
    On a previous day (how many days ago?)
If the answer to the previous question was affirmative, did this market participant's order execute as entered, after accepting a responding quote from a capital provider, or expire unfilled?
If the above prior order was executed, what was the average adverse price movement of the symbol on the continuous market for 2, 5, and 10 times the trade volume following the trade(s)? The adverse price movement is the difference between the midpoint of the National Best Bid and Offer at the time of the fill and the volume-weighted average price associated with all reported trades in the symbol for a subsequent period of time during which reported trades account for an aggregate quantity of 2, 5, or 10 times the size of the subject trade.
Has this market participant placed an order in a different symbol before?
    On the same day?
    On a previous day (how many days ago?)
(The two questions pertaining to this prior order, as above).
Does this market participant have a track record of executing multiple RFQs on the same symbol in the course of a single trading day?
If the answer to the previous question is affirmative, in what percent of cases did the repeat executions occur within a shorter period of time than that taken to observe an aggregate quantity of 2, 5, 10, or 20 times the size of the subject trade?
Does the market participant's present order have reserve quantity beyond what is displayed in the RFQ? This information is determined through use of an "OMS Sniffer" which reads the outstanding orders on the market participant's order management system (OMS).
For market participant orders pegged to a market benchmark such as the midpoint price up to (or down to) an absolute limit, how aggressive or passive is the limit price, as compared to the National Best Bid and Offer?

For how long has the market participant's order been live in the system?

What is the technical state of the market at the time of the RFQ, from the set {equilibrium, falling, rising, falling trend, rising trend, on an apparent bottom, on a top}.

What is the market momentum at the time of the RFQ?

Looking back at previous orders placed by the same market participant and in cases where the market technical situation was similar to the present one, what was the adverse price movement following the event, (as defined above)?

Other questions of relevance will easily be imagined by those skilled in the art. For example, those pertaining to the technical state of the market may include any or all of the technical trading oscillators known in the art. Also of interest is the evolution of such technical indicators in the few minutes following placement of the RFQ. The set of answers to these questions is preferably represented as an input vector for the risk classification function.

The subject system then preferably uses an empirical approach to create a risk model that maps a state vector to one of several possible risk classes. Four preferred risk measures are defined as the adverse price bias (defined below), or zero if the price bias was favorable, each during a period of time sufficient to observe a given aggregate quantity traded on the market. The four preferred risk measures accordingly are defined with aggregate quantities of 2, 5, 10, or 20 times the size of the subject trade, respectively. The overall risk is preferably taken to be the sum of each of these four individual risk measures. The distribution of overall risk measures is then determined; the three tiers in the risk distribution are associated to the "Low", "Medium" or "High" risk classes.

In a preferred linear model, the adverse price bias given an input vector is the sum of the adverse price bias contribution from each input value; where the average price contribution from one input value is the difference between the average adverse price movement over all samples with the given input value, and the average adverse price movement over all samples. In a somewhat more sophisticated model that is useful if the input variables are not mutually independent, the risk function is taken to be a linear sum of terms each associated with a particular input variable. The value of the terms that best matches historical risk according to a dataset of known samples can be determined using a linear regression model, as is well known in the art.

In another classification method, known as a "winner-take-all" approach, a plurality of rules is used, each mapping a set of input values to a risk measure (a positive real number); and the rule that produces the largest risk is retained as winner while all others are ignored. Other risk classification algorithms can be imagined by those skilled in the art; the key element here being not the specific algorithm but the ability of such an algorithm to make use of confidential information to evaluate risk, where such information could not be safely disclosed to a capital provider but the risk classification itself can be disclosed in conjunction with an RFQ.

It is possible that market participants focused on the goal of achieving a low risk classification for their orders may be tempted to reduce their price and size aggression. This type of behavior would negate part of the intended benefits of the present invention by reducing the likelihood of an execution. To prevent or correct this behavior, the subject system preferably uses only input variables where higher aggression levels correlate with lesser risk measures, and discloses this design feature to all market participants so all are aware that price and size aggression can only lower an order's risk class.

Alternate Embodiments

This subject system is an RFQ system for financial instruments. As such, all alternate embodiments dealing with various instruments (bonds, equities, derivatives, futures, etc.) are contemplated by this description. The entire range of potential products within these financial markets are also included in the spirit of this application—for example, using the system for RFQs related to pairs trading, basket trading or any of the other trading mechanisms known to those skilled in the art.

In one alternate embodiment, aspects of the subject system are integrated into an existing ATS, thereby replicating the functionality of the system within the "host" ATS. This alternate embodiment enables any existing ATS to offer an anonymous RFQ system as an adjunct to their existing suite of trading tools by integrating certain features of the subject system into the host system. Because a host ATS would already have all the backend functionality in place to execute and process trades, only the aspects of the subject system that are novel to the host ATS would be integrated. These aspects could include, but are not limited to, the RFQ order entry process, the events database, the risk classification system, and the risk function.

In a specific version of this first embodiment, aspects of the subject system would be integrated into the Pipeline block crossing system described in co-pending U.S. patent application Ser. No. 10/799,205, filed Mar. 11, 2004, incorporated herein by reference. In this embodiment, the subject system is treated as an optional order entry feature such that any participant entering a block order has the option to condition an entry according to risk class. More specifically, when the order is entered, this feature gives the market participant the option to indicate that the order can execute only at the specified price with a contra party of a particular risk class (or better): "if there is an aggressive pending order on the contra side and risk class="B" or better, then offer $23.04." If a user is willing to trade with more than one risk class, then she could enter multiple orders in the same symbol with price points specific to each class.

Alternatively, a user also can risk condition the potential contra parties that can see the user's order in addition to risk conditioning the contra parties with whom a trade could execute. In this embodiment of the Pipeline system, only the participants that meet the risk condition of the order will see the orange light liquidity indicator. When a user chooses to risk condition the viewing of an order in this manner, she also has the ability to reveal more information about the order than is revealed in the traditional Pipeline system. In these cases, clicking on the orange light liquidity indicator would bring up an execution window that would reveal the side, price, and quantity of the order.

In keeping with the protocols of the Pipeline system, if a risk conditioned quote is entered and there is a contra order in the system that meets both the risk class and price parameters of that quote, then the trade auto-executes. If, however, there is a contra order that meets the risk class parameter but does not meet the price parameter, the aggressive party in the match receives a contra-present flag. As in Pipeline, the contra-present flag preferably is displayed on the user application as a yellow-colored rectangle. Clicking on this rectangle opens a small window that lists the actual price of all the conditional orders that meet the risk criteria. The aggressive party can then chose which (if any) of the orders to execute. In this embodiment all participants are within the same user class, anyone can be a CP or MP, and the risk class is not disclosed.

Another alternate embodiment deals with an addition to the order entry process. This embodiment enables the market participant to enter a portion of a larger order, and then set parameters for the order to auto-refresh until the larger order is complete. As part of the auto-refresh parameters, the market participant would indicate how long the system should wait before refreshing the order. The amount of time the market participant is willing to wait between orders is then factored into the risk analysis, since the length of time between order entries will impact how the capital provider views the risk associated with the trade. Market participants who elect to execute several blocks in short order will create additional risk to the capital providers, since any of the CPs may choose to turn to the market to cover their position—this will ultimately be reflected in a higher risk classification for this market participant. As a result, the subject system is self-correcting in that a user with a pattern of aggressive trading behavior will experience wider spreads that appropriately reward capital providers willing to take on the corresponding risk.

Another alternate embodiment deals with variations in how a capital provider can respond to an RFQ. In this embodiment, a capital provider would be allowed to respond to an RFQ with a "mismatch" quote that cannot auto-execute and requires negotiation. For example, a CP could respond with more or less than the requested quantity, a price range, or a different financial instrument. In these cases, a MP receiving a "mismatched" quote would have the ability to initiate a negotiation with the capital provider. This negotiation occurs via a messaging system enabled through the MP's GUI. This messaging system could be based on any number of protocols known to those skilled in the art.

Another group of embodiments alters the information that the subject system shares with the market participants and the capital providers. In one such embodiment, the subject system withholds the risk class from the capital provider, sending only the symbol with the RFQ message. In this embodiment, instead of responding with one two-sided quote, the CP would respond with a two-sided quote for every risk class that it was willing to trade. This embodiment would offer an even higher degree of confidentiality than the preferred embodiment.

In another embodiment, market participants and capital providers have the ability to reveal their identities to each other either before or after execution. If a market participant elects to reveal his identity before the trade, then his RFQ is exposed only to those capital providers on the system with whom he has a previous relationship. In that case, upon receiving an RFQ with a limited identity-exposure request, the subject system would query a "subscriber relationship database" to determine the capital providers with whom the market participant has a subscriber relationship and only route the corresponding RFQ message to the CPs with whom the MP has a relationship. In the event of an execution, the CP would act as the sponsoring broker and process and clear the trade. Likewise, if a CP elects to reveal its identity before the trade, the quote would only be executed against, or sent to (if there is no auto-execution) MPs with whom the CP has a previous relationship. The CP would then act as the sponsoring broker and clear the trade.

If the market participant elected to reveal his identity after the trade, then the RFQ will still only be routed to those capital providers with whom the MP has a previous relationship, but the CP will not be notified of the market participant's identity until after the trade executes, when the information is sent to the CP for clearing. Likewise, if a CP elects to reveal its identity after a trade, the quote would only be executed against, or sent to (in event there is no auto-execution) MPs with whom the CP has a previous relationship. Then the system would step out of the trade to the benefit of the CP, who clears directly with its client.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A computer-implemented method for providing an anonymous request for quotation environment that enables sharing of confidential trading interest information without sacrificing anonymity or enabling information leakage, comprising:

receiving, by a computer, a request for quotation and confidential information regarding said request for quotation from a market participant;

determining, by said computer, a risk categorization for said request for quotation, wherein said risk categorization provides information from which to generate a quotation without revealing said confidential information;

communicating said request for quotation and said risk categorization to at least one capital provider that provides quotations based on risk categorizations that do not reveal said confidential information;

transmitting a message to said at least one capital provider, said message comprising a symbol for said request for quotation but not said risk categorization;

receiving at least two one-sided or two-sided conditional quotations from one or more of said at least one capital provider in response to said message, wherein each of said at least two conditional quotations specifies a maximum risk level for requests for quotation for which said conditional quotation can be revealed; and for each of said at least two conditional quotations, displaying said conditional quotation to said market participant only if said risk categorization for said request for quotation is less than said maximum risk level specified by said conditional quotation.

2. The computer-implemented method of claim 1, wherein said request for quotation comprises an initial block quantity for which a quotation is requested, the method further comprising receiving, by said computer, after a time lag following said request for quotation, an additional request for quotation for an additional block quantity.

3. The computer-implemented method of claim 1, wherein communicating said request for quotation comprises communicating at least one of: a symbol for a financial instrument, information for pairs trading, and information for basket trading.

4. The computer-implemented method of claim 1, wherein determining said risk categorization comprises performing a risk analysis based at least in part on said confidential information regarding said request for quotation and said market participant.

5. The computer-implemented method of claim 4, wherein said confidential information includes information about price movements following past requests for quotation from said market participant.

6. The computer-implemented method of claim 4, wherein said risk analysis is further based on current market conditions.

7. The computer-implemented method of claim 1, further comprising receiving, from a responding capital provider among said at least one capital provider, a two-sided quotation in response to said request for quotation based on said risk categorization.

8. The computer-implemented method of claim 7, further comprising:
    comparing, by said computer, said two-sided quotation to said request for quotation;
    concluding, by said computer, that said two-sided quotation is mismatched with said request for quotation and cannot be auto-executed between said market participant and said responding capital provider; and
    communicating said two-sided quotation to said market participant to enable said market participant to initiate a negotiation with the responding capital provider.

9. The computer-implemented method of claim 7, further comprising:
    comparing, by said computer, said request for quotation to said two-sided quotation;
    concluding, by said computer, that said two-sided quotation is matched with said request for quotation; and
    executing, by said computer, a trade between said market participant and said responding capital provider.

10. The computer-implemented method of claim 9, wherein executing a trade between said market participant and said responding capital provider comprises maintaining permanent anonymity of said market participant when executing said trade.

11. The computer-implemented method of claim 9, further comprising:
    maintaining a list of trusted capital providers for which said market participant does not require anonymity;
    determining that said responding capital provider is in said list of trusted capital providers; and
    revealing said market participant to said responding capital provider.

12. The computer-implemented method of claim 7, further comprising communicating said two-sided quotation to a graphical user interface of said market participant for display.

13. The computer-implemented method of claim 12, further comprising:
    receiving, by said computer, an indication from said graphical user interface of said market participant that said market participant has modified pricing of said request for quotation;
    concluding, by said computer, that said two-sided quotation is matched with said modified pricing of said request for quotation; and
    executing, by said computer, a trade between said market participant and said responding capital provider.

14. The computer-implemented method of claim 12, further comprising at least one of:
    receiving an indication from said graphical user interface of said market participant to cancel said request for quotation, and
    receiving an indication from a graphical user interface of said responding capital provider to cancel said two-sided quotation.

15. The computer-implemented method of claim 7, further comprising receiving from said responding capital provider a two-sided quotation for each of at least two risk categorizations with which said responding capital provider is willing to trade.

16. The computer-implemented method of claim 1, wherein said risk categorization is determined based on a risk model comprising a distribution of overall risk measures, wherein distinct portions of said distribution correspond to distinct risk categorizations.

17. The computer-implemented method of claim 1, wherein determining a risk categorization for said request for quotation comprises:
    for each of a plurality of rules, applying said rule to said request for quote and said confidential information to determine a corresponding risk measure; and
    selecting a largest risk measure among said corresponding risk measures to be said risk categorization.

* * * * *